United States Patent
Francois et al.

(10) Patent No.: US 12,313,129 B2
(45) Date of Patent: May 27, 2025

(54) TRIPOD TYPE CONSTANT VELOCITY JOINT

(71) Applicant: GKN Driveline International GmbH, Lohmar (DE)

(72) Inventors: Marc Francois, Noisy le Roi (FR); Hans-Juergen Post, Bonn (DE)

(73) Assignee: GKN Driveline International GmbH, Lohmar (DE)

( * ) Notice: Subject to any disclaimer, the term of this patent is extended or adjusted under 35 U.S.C. 154(b) by 424 days.

(21) Appl. No.: 17/775,919

(22) PCT Filed: Nov. 18, 2019

(86) PCT No.: PCT/EP2019/081668
§ 371 (c)(1),
(2) Date: May 11, 2022

(87) PCT Pub. No.: WO2021/098945
PCT Pub. Date: May 27, 2021

(65) Prior Publication Data
US 2022/0381298 A1 Dec. 1, 2022

(51) Int. Cl.
*F16D 3/205* (2006.01)
*F16D 3/202* (2006.01)

(52) U.S. Cl.
CPC .... *F16D 3/2055* (2013.01); *F16D 2003/2026* (2013.01); *Y10S 464/905* (2013.01)

(58) Field of Classification Search
CPC .......... F16D 3/2055; F16D 2003/2026; Y10S 464/905

(Continued)

(56) References Cited

U.S. PATENT DOCUMENTS 4,773,890 A  9/1988 Iwasaki et al.
8,608,578 B2 * 12/2013 Oh .................... F16D 3/2055
                                                      464/111

(Continued)

FOREIGN PATENT DOCUMENTS

CN  1902410 A  1/2007
CN  101813139 A  8/2010

(Continued)

OTHER PUBLICATIONS

International Search Report and Written Opinion for PCT/EP2019/081668 mailed on Aug. 3, 2020 (10 pages).

(Continued)

*Primary Examiner* — Greg Binda
(74) *Attorney, Agent, or Firm* — Reising Ethington P.C.

(57) ABSTRACT

A constant velocity joint comprises a male element having arms, a female element having a central axis and defining a pair of symmetrical tracks and an outer roller which can roll on one or other of the two tracks via a peripheral rolling surface. The female element comprises at least one bearing surface which limits the rotation of the outer roller around an axis perpendicular to the axis' of the female element and of the arm. With respect to each arm the cross-section profile of each track comprises either two circular arcs having centers of radii offset one from another, or one single circular arc extending over a female element median plane, and the rolling surface has a part spherical shape or a part torical shape. Each track and the rolling surface are capable of contacting each other at a first and second contact points spaced radially from one another. The tilting of the roller is controlled by proximal and distal rails on the female element and by proximal and distal breaking surfaces on the outer roller.

14 Claims, 5 Drawing Sheets

(58) Field of Classification Search
USPC .......................................................... 464/111
See application file for complete search history.

(56) References Cited

U.S. PATENT DOCUMENTS

| | | |
|---|---|---|
| 2003/0232654 A1 | 12/2003 | Perrow |
| 2005/0107168 A1 | 5/2005 | Izumino et al. |
| 2007/0135219 A1 | 6/2007 | Francois |
| 2011/0053695 A1* | 3/2011 | Yun ........................ F16D 3/2055 |
| | | 464/11 |

FOREIGN PATENT DOCUMENTS

| | | |
|---|---|---|
| CN | 102326007 A | 1/2012 |
| EP | 1503097 A2 | 2/2005 |
| EP | 1780431 A2 | 5/2007 |
| EP | 2535611 A1 | 12/2012 |
| JP | H10246241 A | 9/1998 |
| JP | 2012013207 A | 1/2012 |
| JP | 2014211226 A | 11/2014 |
| JP | 2014214802 A | 11/2014 |
| KR | 20040071382 A | 8/2004 |
| WO | 02059492 A1 | 8/2002 |
| WO | 2011099465 A1 | 8/2011 |

OTHER PUBLICATIONS

Chinese State Intellectual Property Office First Notice of Examination Action mailed Sep. 22, 2023 for application No. CN201980102317.7 (16 pages; with English machine translation).
JPO Notice of Reasons for Refusal mailed Sep. 5, 2020 for related application No. JP2022-528633 (14 pages; with English machine translation).

* cited by examiner

TRIPOD TYPE CONSTANT VELOCITY JOINT

CROSS-REFERENCE TO RELATED APPLICATIONS

This application is a national stage of, and claims priority to, Patent Cooperation Treaty Application No. PCT/EP2019/081668, filed on Nov. 18, 2019, which application is hereby incorporated herein by reference in its entirety.

BACKGROUND

A tripod constant velocity joint generally comprises a male element with ternary symmetry, or a tripod, which is integral with a first rotatory shaft, and a female element with ternary symmetry, or a tulip, which is integral with a second rotatory shaft.

US-2007/135219 describes a constant velocity joint.

There is room to improve the existing joints by providing a mechanical joint with low friction between individual parts and limited the risk of roller jamming when it is operating at an articulated angle.

A joint is desired to be economical and straightforward to manufacture.

SUMMARY

The present disclosure concerns a constant velocity joint of the type having a male element having multiple arms, and a female element having a female element central axis and defining, for each arm, a pair of opposed tracks which are arranged on either side of said arm and which are symmetrical in relation to a radial longitudinal plane of the female element. A mechanical transmission unit comprising an outer roller is mounted on each arm so as to plunge and slide in relation to the arm and which is designed to roll on one or other of the corresponding two tracks via a peripheral rolling surface, the female element furthermore comprising at least one bearing surface which prevents or limits the rotation of the outer roller around an axis perpendicular to the female element central axis (X'-X') and to the axis of the arm.

A constant velocity joint of the aforementioned type, as disclosed herein may be constructed so that, with respect to each arm, the cross-section profile of each track comprises either two circular arcs having centers of radii offset one from another or one single circular arc extending over a female element median plane, the rolling surface has as part spherical shape or a part torical shape, and each track and the rolling surface are capable of contacting each other at first and second contact points spaced radially from one another.

According to examples, the joint has one or more of the following features, taken in isolation or in whatever combination is technically possible: (1) with respect to the first and second contact points, the tangent planes of the track and of the rolling surface are oblique to the radial longitudinal plane; (2) in case the cross-section profile of each track has two circular arcs, their radii are bigger than the radius of the cross section of the rolling surface, or in case the cross-section profile of each track comprises the one single circular arc, the radius of this arc is bigger than the radius of the cross section of the rolling surface; (3) the outer roller comprises a distal braking surface, adjacent the rolling surface and oblique with respect to a central axis of the outer roller, each track has a distal rail surface, and the distal braking surface and the distal rail surface are adapted to cooperate and to limit a pivoting of the outer roller with respect to the track around an axis parallel to the female element central axis; (4) the distal rail surface has a plane or convex cross section, the distal braking surface has a plane or convex cross section, and the distal rail surface and the distal braking surface define one single point of contact; (5) the outer roller comprises a proximal braking surface, adjacent the rolling surface and inclined with respect to a central axis of the outer roller, each track comprises a proximal rail surface, and the proximal braking surface and the proximal rail surface are adapted to cooperate and to limit a pivoting of the outer roller with respect to the track around an axis parallel to the female element central axis; (6) the proximal rail surface has a plane or convex cross section, and the proximal braking surface has a plane or convex cross section, and the proximal rail surface and the proximal braking surface define one single point of contact; (7) the proximal braking surface and proximal rail surface are adapted to limit a proximal displacement of the outer roller with respect to the female element; (8) the mechanical transmission unit comprises an inner ring arranged within the outer roller, with means for coupling the inner ring and the outer roller enabling them to pivot relatively on a common axis of revolution, and either the inner ring is mounted so as to plunge and rotate on said arm and the inner ring is mounted axially fixed relative to the outer roller with respect to the axis of the outer roller, or the inner ring is mounted axially fixed on the arm with respect to the axis of the arm and the inner ring is mounted axially mobile relative to the outer roller with respect to the axis of the outer roller; (9) the means for coupling the inner ring and the outer roller comprise a crown of needles and two support rings, each support ring being arranged on one of two axial sides of the crown of needles and maintaining the needles, and in particular also the inner ring, with respect to the outer roller; (10) the outer roller comprises two grooves on its inner side and each of the two support rings is arranged in one of the two grooves; (11) the outer roller presents a flat front surface arranged perpendicularly to the axis of the outer roller and adapted to contact a bearing surface of the female element, and in that the bearing surface is formed by a bearing area which has a cross profile substantially orthogonal or convex to the radial longitudinal plane corresponding to the contact locations with the flat front surface; (12) with respect to each arm, the bearing area is formed by two bearing surfaces which extend on either side of the radial longitudinal plane, and in that the two bearing surfaces are separated by a radially outwardly recessed portion of the female element; and (13) with respect to each arm, the bearing area is formed by a single bearing surface which extends on either side of the radial longitudinal plane and in that the bearing surface is separated from each operatively associated track by a radially outwardly recessed portion of the female element.

BRIEF SUMMARY OF THE DRAWINGS

The disclosure will be better understood from reading the following description, which is provided by way of example only and referring to the accompanying drawings, wherein.

DESCRIPTION

Figure 1:
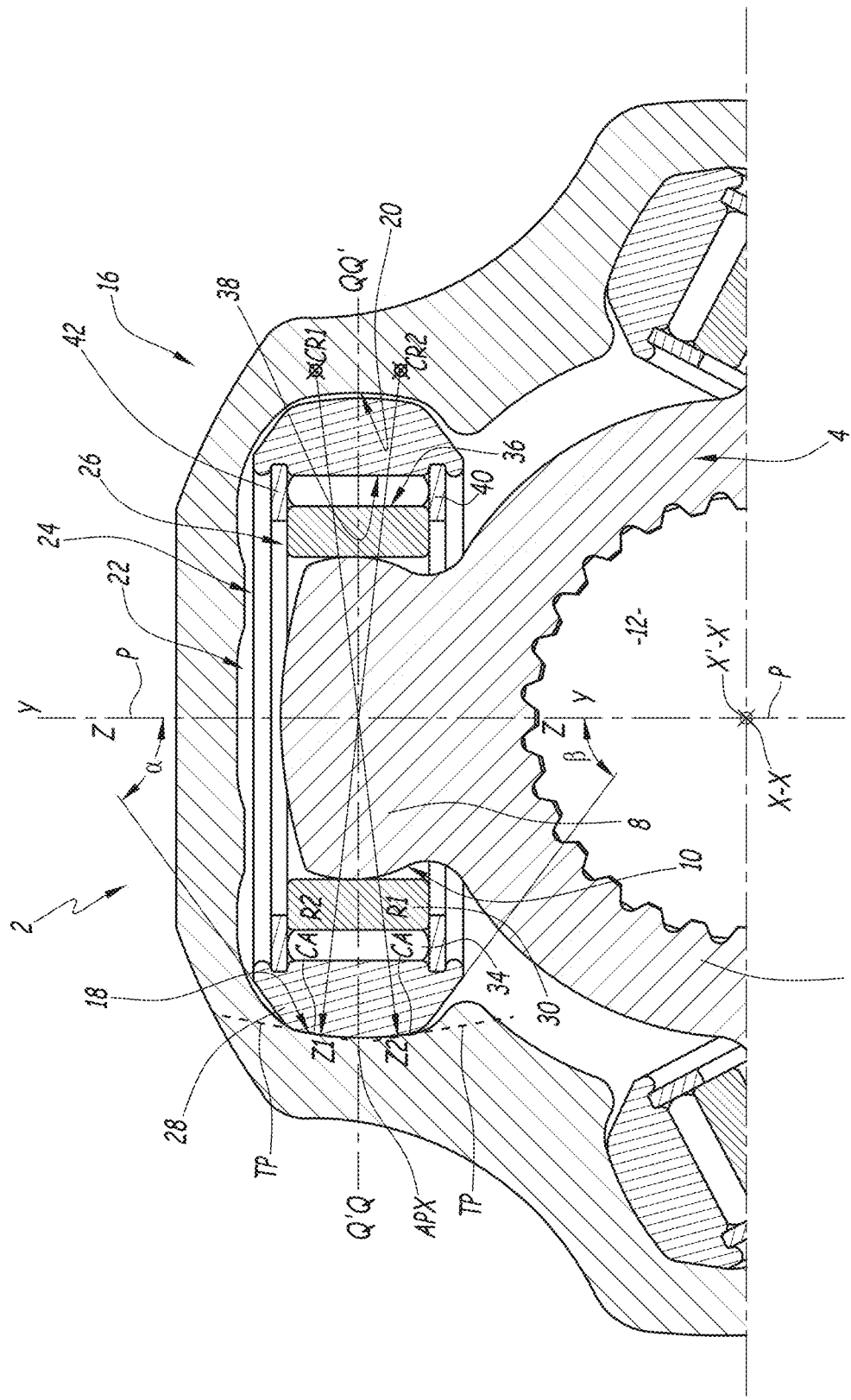
FIG. 1 is a schematic partial, cross-sectional view of a tripod constant velocity joint according to a first embodiment.

FIG. 1 partially illustrates a tripod constant velocity joint 2, designed for a motor vehicle transmission system and comprising:

(1) A male element or tripod 4, of ternary symmetry with respect to a male element central axis X-X (orthogonal to the plane of FIG. 1), and comprising a hub 6 and three radial arms 8 which are spaced at a 120° angle (and only one of which is represented). The end portion of each arm 8 forms a materially integral, spherical bearing area 10 which is centered on an axis Y-Y of the corresponding arm 8. This male element 4 is fixed to a first rotatory shaft 12.

(2) A female element or tulip 16, of ternary symmetry with respect to a female element central axis X'-X', coinciding with the male element central axis X-X in the aligned position of the joint shown. To either side of each arm 8, this tulip presents two opposed tracks 18 and 20, along with an arch 22 which extends between the tracks 18 and 20. The arch 22 forms a bearing area 24. The female element 16 is integral with a second rotatory shaft (not shown).

Unless indicated otherwise, the terms "radial" and "axial" will be used hereinafter with respect to the axis X'-X' of the female element 16.

(3) With respect to each arm 8, a mechanical transmission unit 26 comprising an outer roller 28 and having a revolution axis Z-Z, coinciding with the axis Y-Y of the corresponding arm 8 in the position shown in FIG. 1. The outer roller 28 is adapted to roll on one or the other of the corresponding tracks 18 and 20.

Since the three mechanical transmission units 26 are identical, and because of the ternary symmetries of the male element 4 and the female element 16, only the part of the joint 2 that is wholly depicted in FIG. 1 will be described.

The tracks 18, 20 are symmetrical relative to a radial longitudinal plane P (orthogonal to the plane of FIG. 1) of the female element 16.

The tracks 18, 20 each extend on either side of a female element median plane Q-Q (orthogonal to the plane P and parallel to the axis X'-X').

The cross-section profile, i.e., as viewed in a transverse plane to the axis X'-X' such as the plane of FIG. 1, of each track 18, 20 comprises two circular arcs CA having centers of radii CR1, CR2 offset one from another. The cross-section profile has thus a gothic-type shape or ogive section shape. The cross section profile i.e., the gothic-type shape has one apex APX in which the two circular arcs CA join each other. The apex APX coincides advantageously with the plane Q-Q, and each circular arc CA extends on one side of the female element median plane Q-Q.

Each of the centers of radii CR1, CR2 of the circular arcs associated to one of a track 18, 20 are arranged on the side of the female element median plane Q-Q opposite of the side on which the corresponding circular arc is arranged.

In a non-illustrated variant, the cross-section profile, i.e., as viewed in a transverse plane to the axis X'-X' such as the plane of FIG. 1, of each track 18, 20 comprises one single circular arc extending over the female element median plane Q-Q.

The mechanical transmission unit 26 comprises an inner ring 30, which has a generally cylindrical revolution axis Z-Z and is arranged inside the outer roller 28, and, on the other hand, coupling means 32 for coupling the inner ring 30 and the outer roller 28.

These coupling means 32 comprise a needle crown 34 arranged between a radially outer (in relation to the axis Z-Z) cylindrical surface 36 of the inner ring 30, and a radially inner (in relation to the axis Z-Z) cylindrical surface 38 of the outer roller 28. These coupling means 32 further comprise two annular support rings 40 and 42 arranged on either axial side (with respect to the axis Z-Z) of the ring 30 and the needle crown 34. One or both of the support rings is preferably a closed ring. Alternatively, one or both rings may be traversing slit rings, the traversing slits being nearly closed in the mounted condition of the rings on the roller 28.

The periphery of each support ring 40, 42 is housed in an annular groove 44, 46 incorporated in the surface 38. The rings 40 and 42 hold the needle crown 34 and the inner ring 30 therebetween, with slight free play along the axis Z-Z. The radial height of the ring 30 is less than the radial height of the roller 28.

The coupling means 32 therefore enable relative pivoting of the roller 28 and the inner ring 30 about the axis Z-Z and limited relative translation thereof along the axis Z-Z.

The inner ring 30 comprises a substantially cylindrical, radially inner surface 50 with respect to the axis Z-Z, which surface 50 delimits an aperture for receiving the arm 8. The spherical bearing area 10 of the arm 8 and the surface 50 of the inner ring 30 allow a plunging and sliding motion around the axis Y-Y between the ring 30 and the arm 8.

The outer roller 28 features a peripheral rolling surface 52 that is arranged radially outward of the axis Z-Z. This roller 28 also features a flat front surface 54 and a rear surface 56.

The rolling surface 52 extends along the axis Z-Z, to either side of a median plane Q'-Q' of the outer roller 28. This plane Q'-Q', orthogonal to the axis Z-Z, substantially coincides with the plane Q-Q in the position depicted in FIG. 1. The tracks 18 and 20 together with the further contact point between the roller 28 and the female element (see below) substantially maintain the median plane Q'-Q' of the roller 28 orthogonal to the plane P.

The rolling surface 52 has a part spherical shape. Its cross profile, taken along a plane comprising the axis Z-Z, is therefore circular. The center of the circle CC defining the spherical shape of the surface 52 is in the present case arranged on the central axis Z-Z. The rolling surface has therefore the shape of a spherical segment.

Alternatively, the rolling surface 52 does not have a strictly part spherical shape, but has a part torical shape (i.e. a shape that is a partial torus truncated by two parallel planes extending perpendicular to the central axis of the torus).

Due to the shapes of the rolling surface 52 and the tracks 18, 20, each track 18, 20 and the rolling surface 52 are capable of contacting each other at a first and second contact points (Z1, Z2) spaced radially from one another. Between the contact points Z1 and Z2, the rolling surface 52 and the track 18, 20 with which the outer roller 28 is in contact, the outer roller 28 and the rolling surface 52 are out of contact. In reality, due to the load, the contact in the contact points Z1, Z2 is not a geometrical point, but rather an elliptical contact surface (Hertzian contact). In this case, the contact points are the geometrical centers of the elliptical contact surface.

With respect to the first and second contact points Z1, Z2, the tangent planes TP (FIG. 1) of the track 18, 20 and of the rolling surface 52 are inclined or oblique to the radial longitudinal plane P.

The radii R1, R2 of the two circular arcs of the cross-section profile of each track 18, 20 are bigger than the radius of the cross section, respectively of the part spherical shape, of the rolling surface 52.

Alternatively, in case the cross-section profile of each track 18, 20 comprises one single circular arc extending over the median plane Q'-Q', the radius of this circular arc is bigger than the radius of the cross section, respectively of the part spherical shape, of the rolling surface 52.

The bearing area 24 includes two bearing surfaces 60, 62 whose cross profiles are rectilinear or convex and orthogonal to the radial longitudinal plane P. The bearing area 24 is arranged radially outwardly with respect to the transmission unit 26. The cross profiles of the tracks 18, 20 and of the bearing surfaces 60, 62 form between them an angle of more than 90°. The bearing surfaces keep the outer roller from becoming displaced radially outwards. The bearing surfaces 60, 62 and the tracks 18, 20 are linked by curved recessed profile portions of the female element 16. The two bearing surfaces 60 and 62 are separated from one another by a radially outwardly recessed portion. Accordingly, the area that needs to be hardened is small.

Furthermore, the outer roller 28 comprises a distal braking surface 64 adjacent the rolling surface 52 and oblique with respect to the central axis of the outer roller.

Each track 18, 20 comprises furthermore a distal rail surface 66.

The distal braking surface 64 and the distal rail surface 66 are adapted to cooperate and to limit a pivoting of the outer roller 28 with respect to the track 18, 20, on which the roller is currently rolling, around an axis parallel to the female element central axis (X'-X').

Alternatively, the contact can occur between the small curved portions that are arranged between the braking surface 64 and the rolling surface 52 and between the track 18, 20 and the rail surface 66.

The distal rail surface 66 is arranged adjacent the bearing area 24. A radial recess also exists between the distal rail surface 66 and the bearing area 24 to avoid contact with the roller when the roller is tilting.

Figure 2:
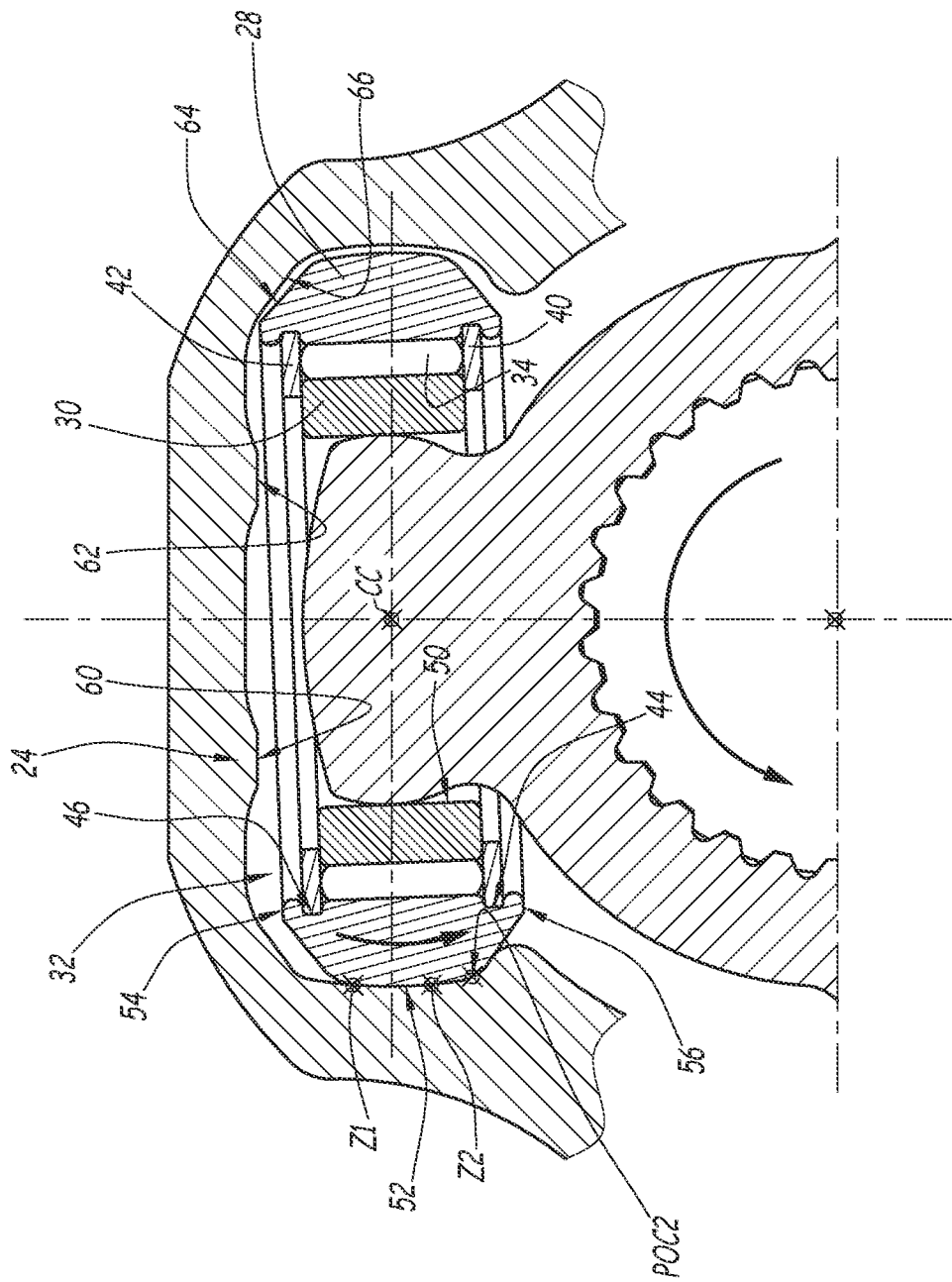
FIGS. 2 and 3 are similar views to FIG. 1, each illustrating a state of the tripod joint during operation.
Figure 3:
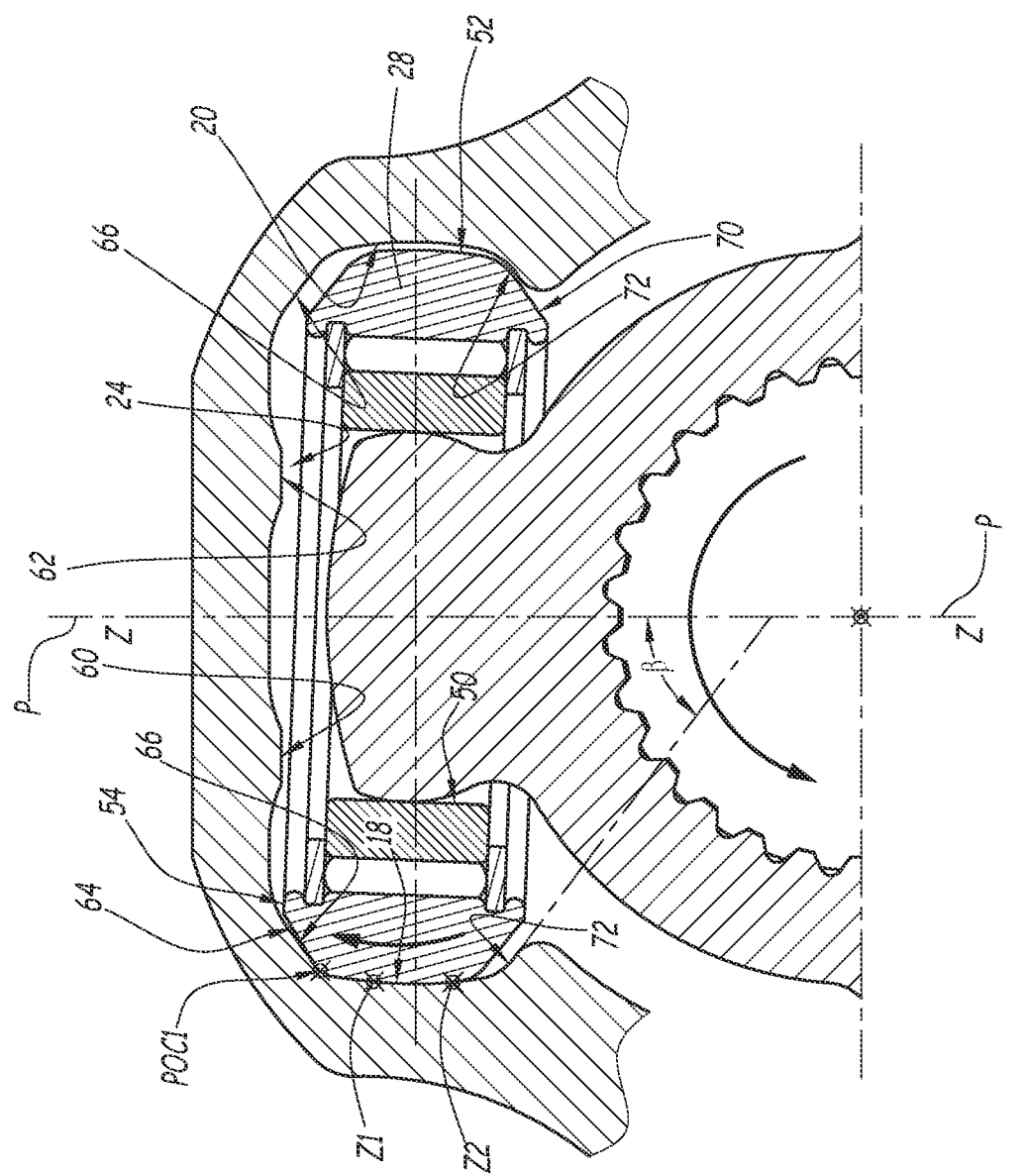

In the embodiment of FIGS. 1 to 3, the distal braking surface 64 has a plane or straight cross section (in a plane comprising axis Z-Z) and has the shape of a partial cone. Alternatively, the distal braking surface may have a convex cross section and be for example in the shape of a partial torus. In the embodiment of FIG. 1, the distal rail surface 66 has a plane or straight cross section (in a plane perpendicular to axis X'-X'). The distal rail surface 66 is therefore plane and extends parallel to axis X'-X'. Alternatively, the distal rail surface 66 has a convex cross section. The distal braking surface and the associated distal rail surface define, in cross section, one single point of contact POC1 (FIG. 3).

The distal rail surface 66 respectively the distal braking surface 64 define with the longitudinal radial plane (P) respectively with the central axis of the outer roller, an angle α (alpha) of between 30° and 60°, preferably between 40° and 50°.

The outer roller 28 comprises a proximal braking surface 70, adjacent the rolling surface 52 and inclined with respect to the central axis of the outer roller.

Furthermore, each track 18, 20 comprises a proximal rail surface 72.

The proximal braking surface 70 and the proximal rail surface 72 are adapted to cooperate and to limit a pivoting of the outer roller 28 with respect to the track 18, 20, on which the roller is currently rolling, around an axis parallel to the female element central axis X'-X'.

Alternatively, the contact can occur between the small curved portions that are arranged between the braking surface 70 and the rolling surface 52 and between the track 18, 20 and the rail surface 72.

In the embodiment of FIGS. 1 to 3, the proximal braking surface 70 has a plane or straight cross section (in a plane comprising axis Z-Z) and has the shape of a partial cone. Alternatively, the proximal braking surface may have a convex cross section and be for example in the shape of a partial torus. In the embodiment of FIG. 1, the proximal rail surface 72 has a plane or straight cross section (in a plane perpendicular to axis X'-X'). The proximal rail surface 72 is therefore planar and extends parallel to axis X'-X'. Alternatively, the proximal rail surface 72 has a convex cross section. The proximal braking surface and the associated proximal rail surface define, in cross section, one single point of contact POC2 (see FIG. 2).

The proximal rail surface 72 respectively the proximal braking surface 70 define with the longitudinal radial plane (P), respectively with the central axis of the outer roller, an angle β (beta—see FIG. 3) of between 30° and 60°, preferably between 40° and 50°.

The terms "proximal" and "distal" are used in relation to the central axis X-X or X'-X', whereby the term "distal" refers to a position remote from the central axis and "proximal" close to the central axis.

The proximal braking surface 70 and the proximal rail surface 72 of both tracks 18, 20 are adapted to limit a proximal displacement, i.e. radially inward with respect to the axis X'-X', of the outer roller 28 with respect to the female element.

The flat front surface 54 is annular shaped, extends perpendicular to the axis of the outer roller Z-Z and is adapted to enter into contact with the bearing surfaces 60, 62 formed by the bearing area.

When the joint 1 is in operation, the contact between one of the tracks 18 or 20 and the rolling surface 52 will be essentially a two point contact. Accordingly, and as the track 18 in FIG. 1 illustrates, there will then be two contact points Z1 and Z2, spaced radially apart and situated to either side of the plane Q'-Q'. The two contact points Z1 and Z2 are separated radially from one another by a non-contact portion in which the roller 28 is out of contact with the female element 16.

During operation, the distal braking surface 64 of the outer roller 28 enters also in contact (point POC1) with the distal rail surface 66 of the track 18 or 20, with which the rolling surface 52 is currently in contact (i.e. on the rolling side), and limits the rotation of the outer roller around an axis parallel to axis X'-X' and directed outwardly (clockwise on FIGS. 1 to 3 and as illustrated on FIG. 3).

Likewise, during operation, the proximal braking surface 70 of the outer roller 28 enters also in contact (point POC2) with the proximal rail surface 72 of the track 18 or 20, with which the rolling surface 52 is currently in contact (i.e. on the rolling side), and limits the rotation of the outer roller around an axis parallel to axis X'-X' and directed inwardly (counterclockwise on FIGS. 1 to 3 and as illustrated on FIG. 2).

In any of these configurations, the roller 28 is out of contact with the track 20 and 18 or its proximal or distal rail on the counterside, i.e. with the track or rail on which the roller is not currently rolling. In any of these configurations, and as the roller rolling surface has a low degree of toricity (e.g. spherical or close to spherical), the outer roller 28 will rotate around an axial axis located at same distance of track 20 and 18. The outer roller 28 will be out of contact with the track 20 and 18 or its proximal or distal rail on the counterside, i.e. with the track or rail on which the roller is not currently rolling. Consequently, the rolling friction is reduced.

Figure 5:
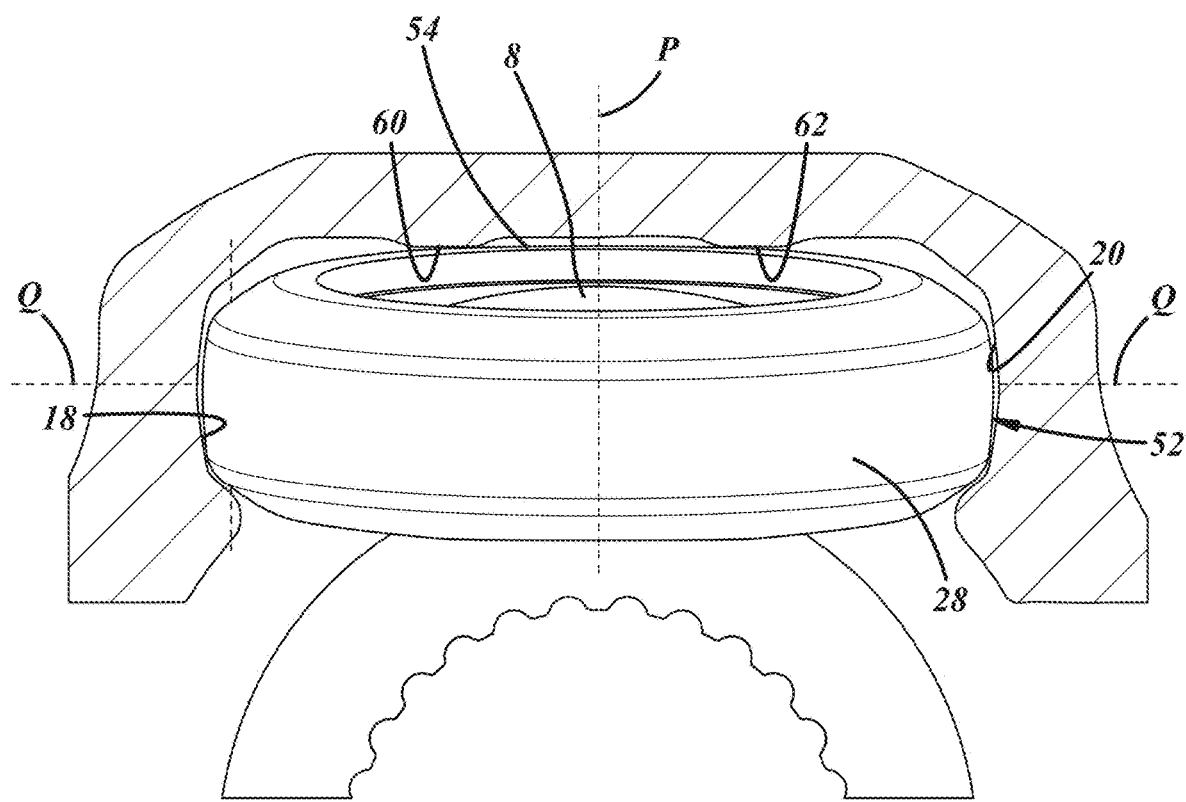
FIG. 5 is similar to FIG. 3 and illustrates a state of the tripod joint during operation.

The flat surface 54 enters into contact with the bearing surfaces 60, 62, which prevents or limits the rotation of the outer roller around an axis perpendicular to the central axis X-X or X'-X and to the axis of the arm 8, as shown, for example, in FIG. 5 (pitch rotation).

The disclosed configuration of the joint leads to the generation of little or no shudder of the joint during operation. The joint is easy to manufacture, economical and durable.

Figure 4:
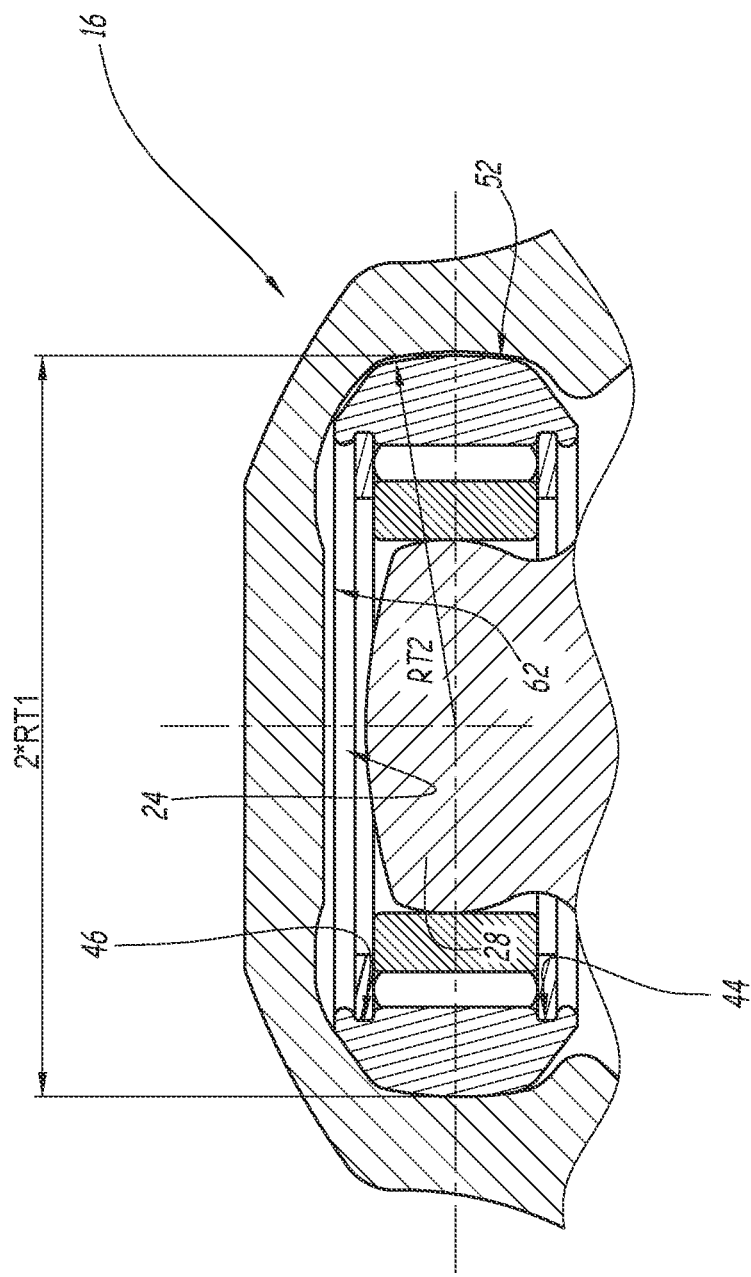
FIG. 4 is a partial cross-sectional view similar to FIG. 1 of a tripod constant velocity joint according to a second embodiment of the invention.

FIG. 4 illustrates a second embodiment of a constant velocity joint according to the invention, differing from the constant velocity joint depicted in FIG. 1 as follows.

The female element 16 of said joint comprises a bearing area 24 consisting of a single bearing surface 62 which extends from the longitudinal radial plane P on either side thereof, and the bearing surface (62) is separated from each operatively associated track (18, 20) by a radially outwardly recessed portion of the female element.

The rolling surface 52 of the outer roller 28 has a degree of toricity T=RT2/RT1 comprised between 0.8 and 1. The dimension RT1 is the radius of the rolling surface 52 which is the distance between the center axis Z-Z taken in the median plane Q'-Q' and the rolling surface 52. The dimension RT2 is the radius of the rolling surface 52 taken in a plane containing the central axis Z-Z.

In the foregoing embodiments, the inner ring 30 is mounted slidably with respect to the arm 8 along the axis Y-Y and the inner ring 30 and the needle crown 34 are axially fixed with respect to the axis Z-Z of the outer roller 28. In an alternative embodiment, the inner ring 30 is mounted axially fixed on the arm 8 along the axis Y-Y, but pivotably mobile on the arm 8, while the inner ring 30 is axially slidably mounted on the needle crown 34 along the axis of the outer roller. The inner ring has a concave spherical shape cooperating with a convex spherical shape of the arm 8. In this case, the mechanical transmission unit is as depicted and disclosed in FIGS. 3 and 4 of US2005/0107168. The remaining features of this embodiment are as disclosed above in relation to the embodiments of FIGS. 1 to 4.

The invention claimed is:

1. A constant velocity joint, comprising
a male element having multiple arms;
a female element having a female element central axis and defining, for each of the arms, a pair of opposed tracks which are arranged on either side of said arm and which are symmetrical in relation to a radial longitudinal plane of the female element, wherein mounted on each arm there is a mechanical transmission unit comprising an outer roller which is mounted so as to plunge and slide in relation to the respective arm and which rolls on one or other of the corresponding two tracks via a peripheral rolling surface, the female element further including at least one bearing surface which prevents or limits the rotation of the outer roller around an axis perpendicular to the female element central axis and to the axis of the arm;
wherein, with respect to each of the arms:
the cross-section profile of each track comprises either two circular arcs having centers of radii offset one from another;
the rolling surface has a part spherical shape or a part torical shape; and
each track and the rolling surface are capable of contacting each other at first and second contact points spaced radially from one another;
wherein in case the rolling surface has a part spherical shape its cross profile, taken along a plane comprising a revolution axis of the outer roller, is circular with the center of a circle, defining the spherical shape of the surface, being arranged on the central axis;
wherein in case the rolling surface has a part torical shape the degree of toricity T=RT2/RT1 is between 0.8 and 1;
wherein the dimension RT1 is the radius of the rolling surface which is the distance between the central axis taken in a median plane of the outer roller and the rolling surface, and the dimension RT2 is the radius of the rolling surface taken in a plane containing the central axis.

2. The constant velocity joint of claim 1, wherein with respect to the first and second contact points, the tangent planes of the track and of the rolling surface are oblique to the radial longitudinal plane.

3. The constant velocity joint of claim 1, wherein
the cross-section profile of each track has the two circular arcs and their radii are bigger than the radius of the cross section of the rolling surface.

4. The constant velocity joint of claim 1, wherein
the outer roller comprises a distal braking surface, adjacent the rolling surface and oblique with respect to a central axis of the outer roller;
each track has a distal rail surface; and
the distal braking surface and the distal rail surface are adapted to cooperate and to limit a pivoting of the outer roller with respect to the track around an axis parallel to the female element central axis.

5. The constant velocity joint of claim 4, wherein
the distal rail surface has a plane or convex cross section;
the distal braking surface has a plane or convex cross section; and
the distal rail surface and the distal braking surface define a single point of contact.

6. The constant velocity joint of claim 1, wherein
the outer roller comprises a proximal braking surface, adjacent the rolling surface and inclined with respect to a central axis of the outer roller;
each track comprises a proximal rail surface; and
the proximal braking surface and the proximal rail surface are adapted to cooperate and to limit a pivoting of the outer roller with respect to the track around an axis parallel to the female element central axis.

7. The constant velocity joint of claim 6, wherein
the proximal rail surface has a plane or convex cross section;
the proximal braking surface has a plane or convex cross section; and
the proximal rail surface and the proximal braking surface define a single point of contact.

8. The constant velocity joint of claim 6, wherein the proximal braking surface and proximal rail surface are adapted to limit a proximal displacement of the outer roller with respect to the female element.

9. The constant velocity joint of claim 1, wherein
the mechanical transmission unit comprises an inner ring arranged within the outer roller, with a coupling of the inner ring and the outer roller enabling them to pivot relatively on a common axis of revolution and the inner ring is mounted so as to plunge and rotate on said arm and the inner ring is mounted axially fixed relative to the outer roller with respect to the axis of the outer roller.

10. The constant velocity joint of claim 9, wherein the coupling of the inner ring and the outer roller comprise a crown of needles and two support rings, each support ring being arranged on one of two axial sides of the crown of needles and maintaining the needles, and in particular also the inner ring, with respect to the outer roller.

11. The constant velocity joint of claim 10, wherein the outer roller comprises two grooves on its inner side and each of the two support rings is arranged in one of the two grooves.

12. The constant velocity joint of claim 1, wherein the outer roller presents a flat front surface arranged perpendicularly to the axis of the outer roller and adapted to contact a bearing surface of said at least one bearing surface of the female element, and the bearing surface of said at least one bearing surface is formed by a bearing area which has a cross profile substantially orthogonal and convex to the radial longitudinal plane corresponding to the contact locations with the flat front surface.

13. The constant velocity joint of claim 12, wherein, with respect to each arm, the bearing area is formed by two bearing surfaces which extend on either side of the radial longitudinal plane, and the two bearing surfaces are separated by a radially outwardly recessed portion of the female element.

14. The constant velocity joint of claim 12, wherein, with respect to each arm, the bearing area is formed by a single bearing surface which extends on either side of the radial longitudinal plane and the bearing surface is separated from each operatively associated track by a radially outwardly recessed portion of the female element.

* * * * *